United States Patent [19]
Rieder

[11] Patent Number: 6,142,565
[45] Date of Patent: Nov. 7, 2000

[54] INFANT CHAIR LINER

[76] Inventor: Sari B. Rieder, 6728 Green Island Cir., Lake Worth, Fla. 33463

[21] Appl. No.: 09/162,200

[22] Filed: Sep. 28, 1998

[51] Int. Cl.⁷ .................................................. A47C 31/11
[52] U.S. Cl. .............................. 297/219.12; 297/228.13; 297/228; 297/219.1; 297/228.1; 297/227; 297/229; 297/256.17; 297/254
[58] Field of Search ........................... 297/219.12, 219.1, 297/227, 228, 228.1, 228.13, 229, 256.17, 254

[56] References Cited

U.S. PATENT DOCUMENTS

| | | | |
|---|---|---|---|
| D. 294,099 | 2/1988 | Bromberg et al. | D6/333 X |
| D. 294,210 | 2/1988 | Rhodes et al. | D6/333 X |
| 3,517,963 | 6/1970 | Woods et al. | 297/228 |
| 4,225,179 | 9/1980 | Visconti | 297/219.1 |
| 4,383,713 | 5/1983 | Roston | 297/219.12 X |
| 4,695,092 | 9/1987 | Hittie | 297/219.12 |
| 4,775,183 | 10/1988 | Tsuge et al. | 297/219.12 |
| 4,844,539 | 7/1989 | Selbert | 297/228.13 |
| 4,892,357 | 1/1990 | Nieto-Busby et al. | 297/219.12 X |
| 5,123,699 | 6/1992 | Warburton | 297/219.12 |
| 5,354,118 | 11/1994 | Barry | 297/219.12 X |
| 5,482,352 | 1/1996 | Leal et al. | 297/219.12 X |
| 5,486,037 | 1/1996 | Harper | 297/219.12 X |
| 5,547,250 | 8/1996 | Childers | 297/219.12 X |
| 5,551,749 | 9/1996 | Reher et al. | 297/219.12 |
| 5,560,683 | 10/1996 | Penley et al. | 297/228.13 X |
| 5,586,351 | 12/1996 | Ive | 297/219.12 X |
| 5,829,829 | 11/1998 | Celestina-Krevh | 297/219.12 |
| 5,833,309 | 11/1998 | Schmitz | 297/219.12 X |
| 5,842,739 | 12/1998 | Noble | 297/219.12 |

FOREIGN PATENT DOCUMENTS

990112  4/1965  United Kingdom ................ 297/228.1

*Primary Examiner*—Peter M. Cuomo
*Assistant Examiner*—Rodney B. White
*Attorney, Agent, or Firm*—Oltman, Flynn & Kubler

[57] ABSTRACT

A chair liner for highchairs, strollers, shopping carts, car seats or the like includes a back panel extending from a bottom edge to about head height of an infant, and two relatively thick arms projecting from the back panel to a front edge. The back panel preferably has a curved top edge and the arms gradually taper inwardly from the back panel to the front edge. The arms and the back panel are of a one-piece construction. The liner has a washable fabric covering held on by a zipper which is easily opened to allow removal of the cover. The cover is machine washable and easily reinstalled. The liner fits most standard chairs and booster seats, and it must be used with chair restraints.

6 Claims, 2 Drawing Sheets

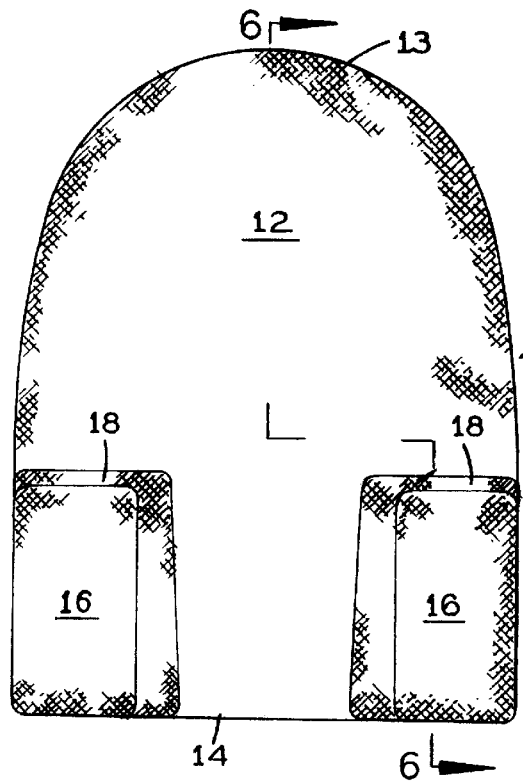
FIG. 1
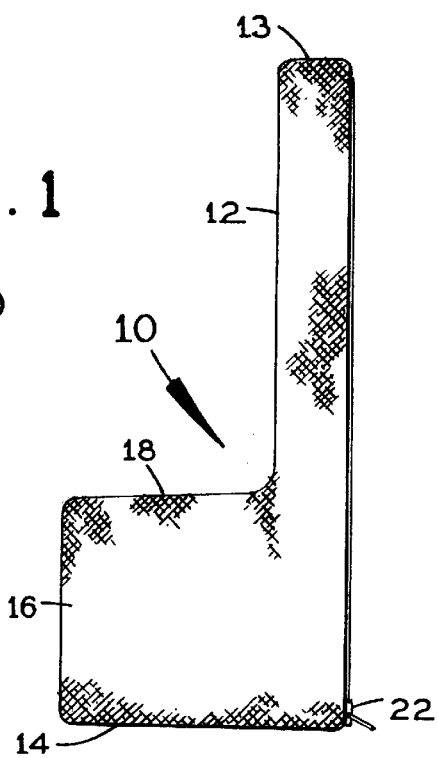
FIG. 2
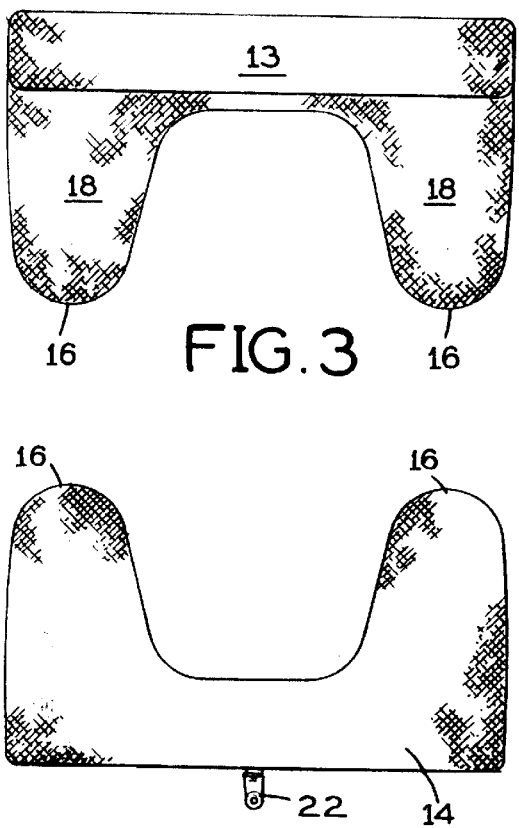
FIG. 3
FIG. 5
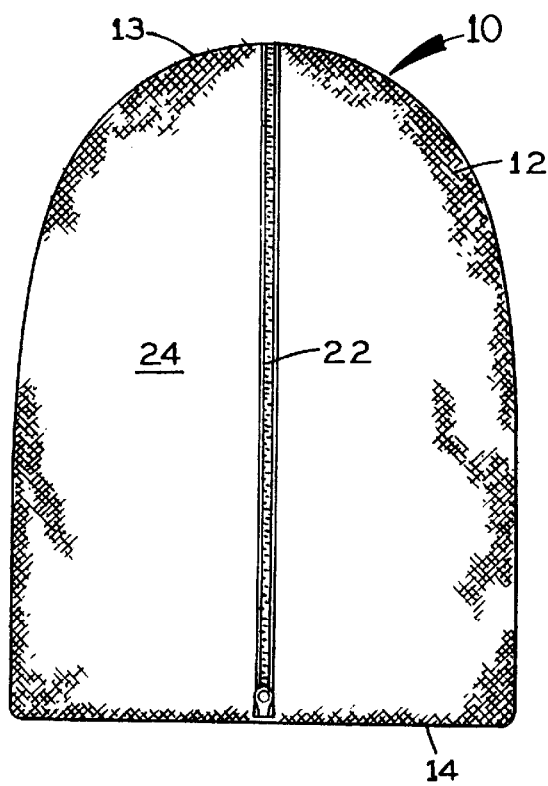
FIG. 4

U.S. Patent    Nov. 7, 2000    Sheet 2 of 2    6,142,565
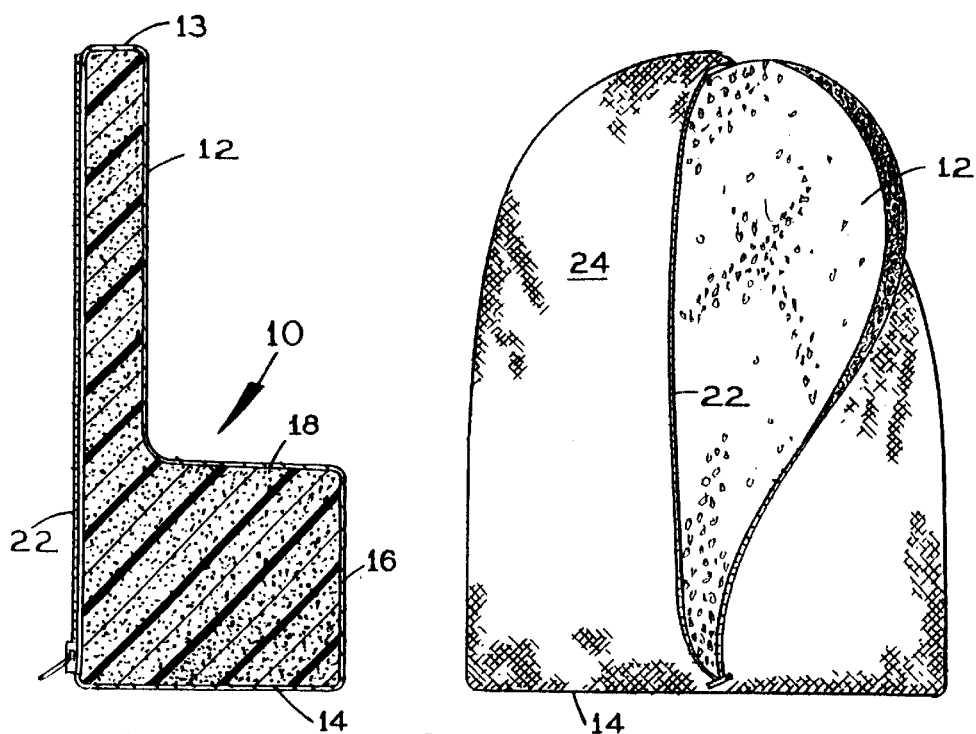
FIG. 6
FIG. 7
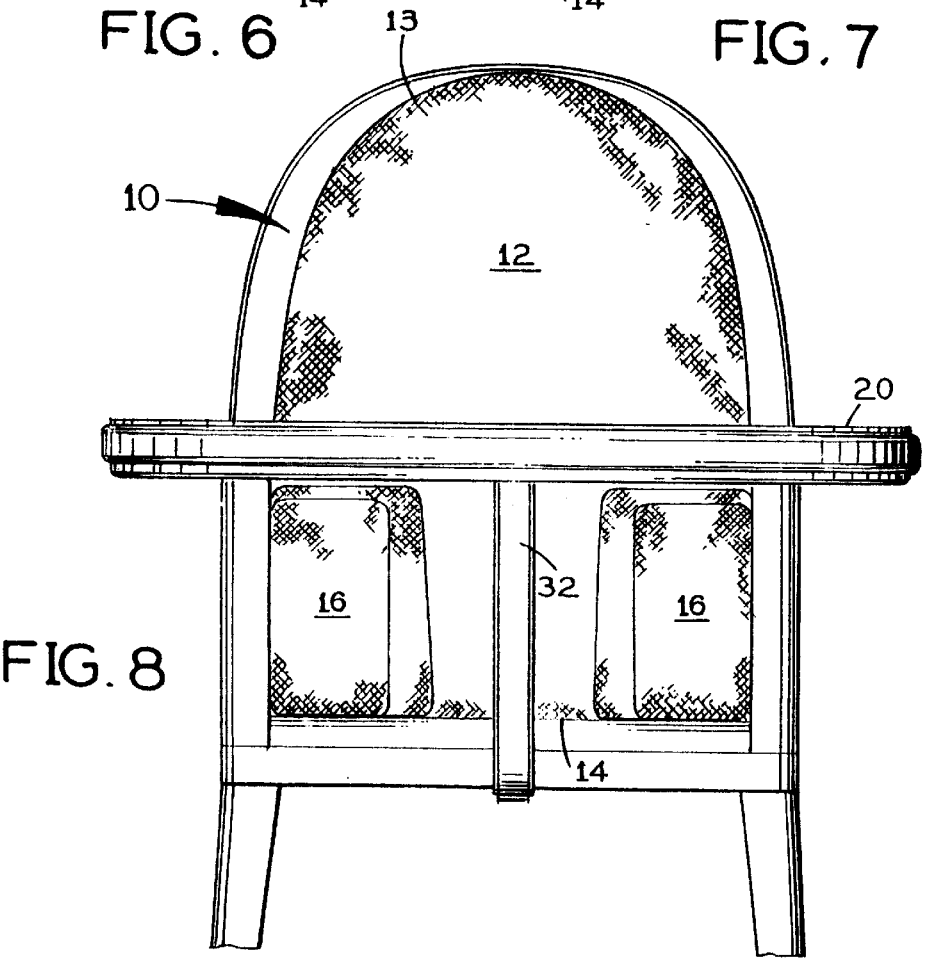
FIG. 8

6,142,565

INFANT CHAIR LINER

This application relates to infant chair liners, and particularly to such liners for highchairs, strollers, shopping carts, car seats and the like.

BACKGROUND OF THE INVENTION

Car seats and highchair seats are well known, and various types have been proposed. Also, car seats covers are known such as, for example, that described in U.S. Pat. Des. No. 294,099. This is a fabric cover for a car seat which has a cat's face included in it. The cover does not lend stability to the seat, perhaps resulting in safety problems.

U.S. Pat. No. 5,586,351 describes an infant support pad with an adjustable pillow adapted to engage an infant's head, neck and shoulders in order to provide lateral stability to the infant's head and neck. No support for the infant's arms is provided, and stability for the remainder of the child's body may be a problem.

A padded liner for an automobile seat is shown in U.S. Pat. No. 4,695,092. The liner is in the shape of an animal and generally conforms to the shape of the car seat.

Other patents of interest are U.S. Pat. No. 5,551,749; U.S. Pat. Des. No. 294,210; and U.S. Pat. No. 4,892,357.

SUMMARY OF THE INVENTION

The present invention is a washable, portable, infant chair liner which keeps the infant sitting upright, and makes the baby feel safe, snug and secure. It has a removable fabric or plastic cover which is machine washable and easily reinstalled. There is no need to stuff towels or blankets in the sides of the chair and it fits most standard highchairs, booster seats, strollers, car seats and the like. It must be used along with the straps of the chair.

Accordingly, an object of the invention is to provide an infant chair liner which is suitable for highchairs, strollers, shopping carts, car seats and the like.

Another object of the invention is to provide an infant chair liner which is safe and lends stability to an infant sitting in the chair.

A further object of the invention is to provide a foam chair liner with a zip-off cover which is machine washable and easily reinstalled.

Further objects and advantages of this invention will be apparent from the following detailed description of a presently preferred embodiment, shown schematically in the accompanying drawings.

BRIEF DESCRIPTION OF THE DRAWINGS

FIG. 1 shows a front elevational view of a chair liner in accordance with the one embodiment the invention;

FIG. 2 shows a right side elevational view thereof;

FIG. 3 is a top plan view thereof;

FIG. 4 is a rear elevational view thereof showing the zipper in the cover for easy removal purposes;

FIG. 5 is a bottom plan view thereof;

FIG. 6 a sectional view taken along line 6—6 of FIG. 1;

FIG. 7 is a rear view showing the zipper released to reveal the foam construction, and FIG. 8 is a front elevational view showing the chair liner in a highchair with the chair tray in the down position.

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

The chair liner 10 is preferably made of plastic foam or rubber foam and is sufficiently thick to stand upright and be self-supporting in a seat which does not have a full back and yet have some resiliency. The liner includes a back panel 12 extending from the bottom edge 14 up to the top of an infant's head, and is tall enough to extend substantially above the tray of a highchair and provide for support of an infant's body and head. The back panel has a semi-circular top edge 13. Extending forwardly from the back panel in the lower section of the back panel are two thick arm supports 16. These arm supports extend up from the bottom edge 14 of the back panel to a level at 18 which is just below the mid height of the back panel 12. Note that the arms taper inwardly from the back panel 12 to the front edge making it easier to remove the cover.

As shown in FIG. 8, the tops 18 of the arms 16 fit just below the chair tray of a highchair to provide support for the arms of the child and also to provide easy access for the arms to reach the tray 20 a strap 32 extends up from the seat between the child's legs to the tray 20. The back panel 12 and the arms 16 are of one-piece construction. Both the arms and the back panel are covered by a zip-off fabric covering 24 such as terry cloth or plastic, which is readily machine washable. The zipper 22 is shown in the closed position in FIG. 4 and in the open position in FIG. 7. The cover 24 can easily be removed from the whole liner, washed, and reinstalled with little effort.

The infant sits between the arms 16 directly on the chair since there is no bottom portion of the liner between the arms. The liner is particularly useful when the baby is too big for an infant carrier and too small for a highchair without a liner. The chair liner is a safe and secure way to support an infant in a chair such as a highchair, particularly when feeding the infant. There is no need to ever stuff towels or blankets in the sides of the high chair. Note that the chair liner must be used with chair restraints. In addition to being used in highchairs, it can also be used in strollers, shopping carts, car seats and the like. An alternate version could be inflatable.

I claim:

1. A portable infant chair liner for highchairs, strollers, car seats, and shopping carts, comprising:

a back panel having a bottom edge and a top edge;

a pair of thick arms extending forwardly from the back panel as protrusions, said arms having a bottom edge and a top edge, the bottom edge of said arms common with the bottom edge of the back panel, each arm extending upward from the common bottom edge of the back panel to slightly below the mid-height of the back panel;

said arms and said back panel being integral with each other and of one piece construction, and said arms being the only protrusions from the said back panel;

said liner having an open space with no seat between said arms and below said arms so that when said liner is in a chair seat, said common bottom edges of said back panel and said arms rest on said chair seat and an infant can sit directly on and in contact with the seat of the chair between said arms with its head resting against said back panel.

2. The chair liner of claim 1, further including a cover covering said arms and said back panel and having a zipper on one side of said covering for easy removal purposes.

3. The chair liner of claim 2, wherein the back panel has a semi-circular top edge.

4. The chair liner of claim 2, wherein said arms taper inwardly from the back panel to a front side thereof.

5. The chair liner of claim 1, wherein said arms and back panel are made of foam.

6. The chair liner of claim 5, wherein said foam is resilient.

* * * * *